United States Patent

[11] 3,572,624

[72] Inventors Carl J. Holdampf
Southfield;
Randal T. Murphy, Royal Oak, Mich.
[21] Appl. No. 850,938
[22] Filed Aug. 18, 1969
[45] Patented Mar. 30, 1971
[73] Assignee Lear Siegler, Inc.
Santa Monica, Calif.

[54] SUSPENSION SEAT
17 Claims, 6 Drawing Figs.

[52] U.S. Cl. .................................... 248/376,
248/378, 248/399, 254/110, 297/307, 297/348
[51] Int. Cl. .................................... B60n 1/02
[50] Field of Search ........................... 248/372,
377, 376, 378, 396, 397, 399, 400, 401; 297/304,
307, 308, 348; 254/108, 109, 110, 111; 74/151.5,
535, 575, 577

[56] References Cited
UNITED STATES PATENTS

| | | | |
|---|---|---|---|
| 1,629,140 | 5/1927 | Bate | 254/110 |
| 2,334,922 | 11/1943 | Gustafson | 248/401 |
| 2,685,324 | 8/1954 | Kramer | 248/378 |
| 2,840,140 | 6/1958 | Harrington | 248/376 |
| 2,961,033 | 11/1960 | Galbraith | 248/378 |
| 3,110,475 | 11/1963 | Achterberg et al. | 254/109 |
| 3,215,386 | 11/1965 | Swenson | 248/400 |
| 3,325,136 | 6/1967 | Radke et al. | 248/400 |

FOREIGN PATENTS

| | | | |
|---|---|---|---|
| 774,129 | 5/1957 | Great Britain | 297/308 |
| 491,059 | 3/1953 | Canada | 297/308 |
| 910,582 | 2/1946 | France | 248/399 |

Primary Examiner—Marion Parsons, Jr.
Attorney—Barnard, McGlynn and Reising

ABSTRACT: A vertically adjustable seat of the type wherein the seat portion is connected to a mounting base by a parallelogram linkage to permit vertical adjustment of the seat without affecting the angularity thereof. A force transmitting adjuster mechanism such as a bidirectionally lockable jack is connected between the free end of a support spring and the seat portion to effect the vertical adjustment while fully retaining the resilient effect of the support spring. A damping device, such as a shock absorber, is mechanically connected in parallel with the support spring to damp oscillation of the seat portion relative to the mounting base.

Patented March 30, 1971

INVENTORS
Carl J. Holdampf, &
BY Randal J. Murphy

Barnard, McGlynn & Reising
ATTORNEYS

INVENTORS
Carl J. Holdampf, &
BY Randal J. Murphy

Barnard, McGlynn & Reising
ATTORNEYS

Patented March 30, 1971

INVENTORS
Carl J. Holdampf, &
BY Randal T. Murphy

Barnard, McGlynn & Reising
ATTORNEYS

SUSPENSION SEAT

This invention relates to vertically adjustable seats and more particularly to a seat wherein a vertical or height adjustment is effected by means of a force transmitting adjuster mechanism disposed between a seat portion and the free or displaceable end of a suspension spring secured to a base member.

In seating apparatus adapted for transportation applications, for example for trucks and busses, it is desirable to support the seat upon a resilient structure thereby to attenuate displacements of the mounting or support structure which might be otherwise transmitted to the occupant of the seat. It is also desirable to be able to adjust the height or vertical spacing between the seat and the mounting structure to accommodate seat occupants of different heights or comfort requirements.

In accordance with the present invention, a seat member is supported relative to a mounting base member by means of a supporting and motion attenuating spring member in such a manner as to permit adjustment of the vertical spacing between the seat member and the spring member thereby to accomplish adjustment of the vertical spacing between the seat member and the mounting base. In general, this is accomplished by mounting the spring member upon the base member and mechanically connecting a force transmitting extensible adjuster mechanism, such as a jack, between the free or displaceable end of the spring member and the seat member. Accordingly, by selective operation of the force transmitting adjuster mechanism, the spacing between the seat member and the free or displaceable end of the spring member may be varied thereby varying the vertical spacing between the seat and base members while retaining the full benefit of the motion attenuating spring member.

In a preferred form of the invention, the spring member is a vertically disposed coil spring, the free end of which is mechanically connected to the seat member by means of a jack having a manually operable drive pawl and an extensible rack. In addition, a damping device, such as a shock absorber, may be mechanically connected in parallel with the spring member.

In a specific embodiment of the invention the height adjusting jack when adjusted to a desired position is latched to prevent further extension thereof due to dynamic unloading of the seat. This may occur on rebounding from a road shock. This latching is accomplished by providing the jack with a latch dog having a tooth which normally engages the rack to prevent relative displacement therebetween in either of the possible directions of rack travel. The latch dog is disengaged from the rack when adjustment is desired by suitable connection to the driving pawl.

Further features and advantages of the invention will become apparent upon reading the following specification which is to be taken with the accompanying drawings of which:

Figure 1:
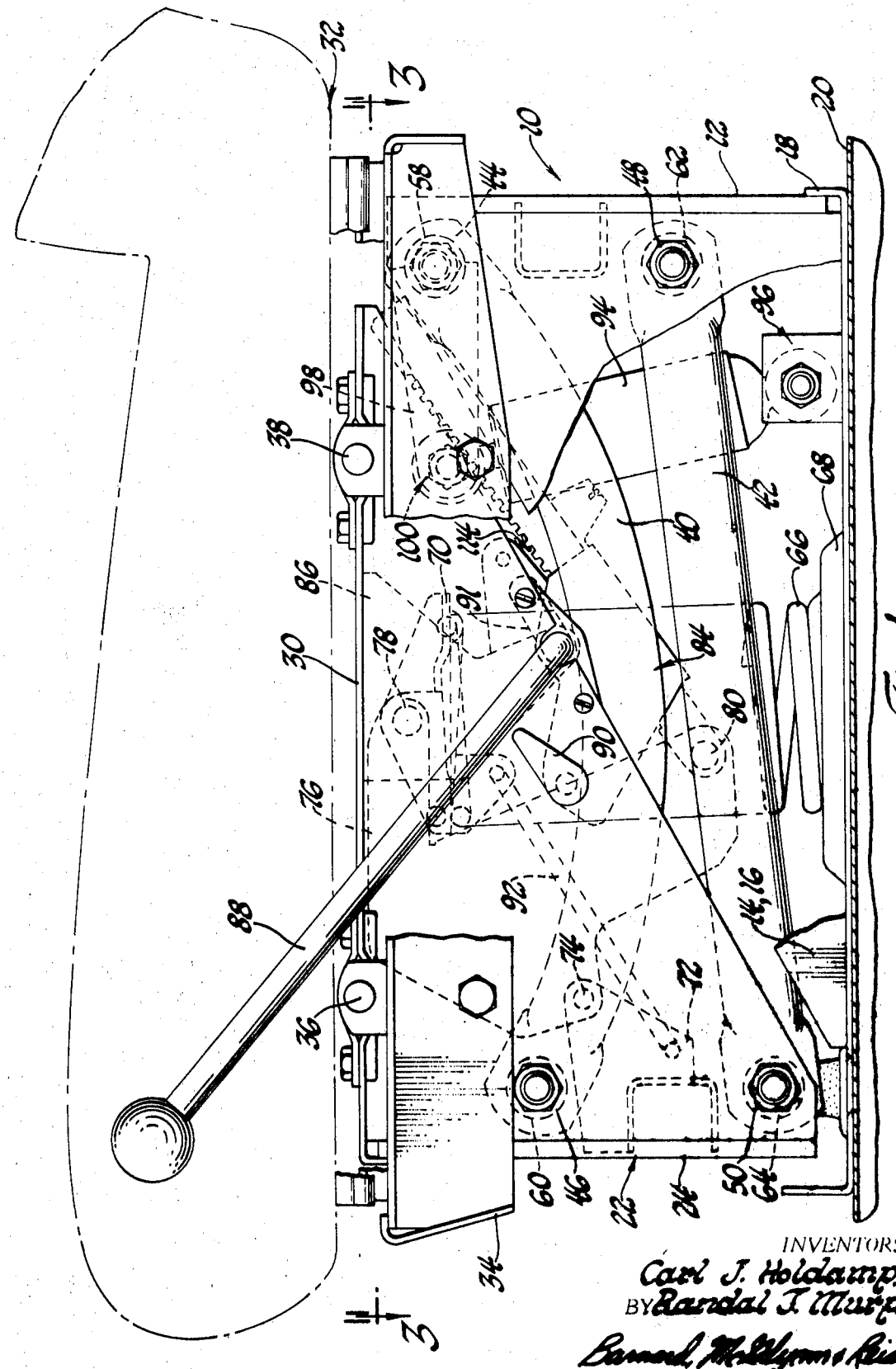
FIG. 1 is a side view of an illustrative seat suspension mechanism employing the invention and shown in a fully lowered position.
Figure 2:
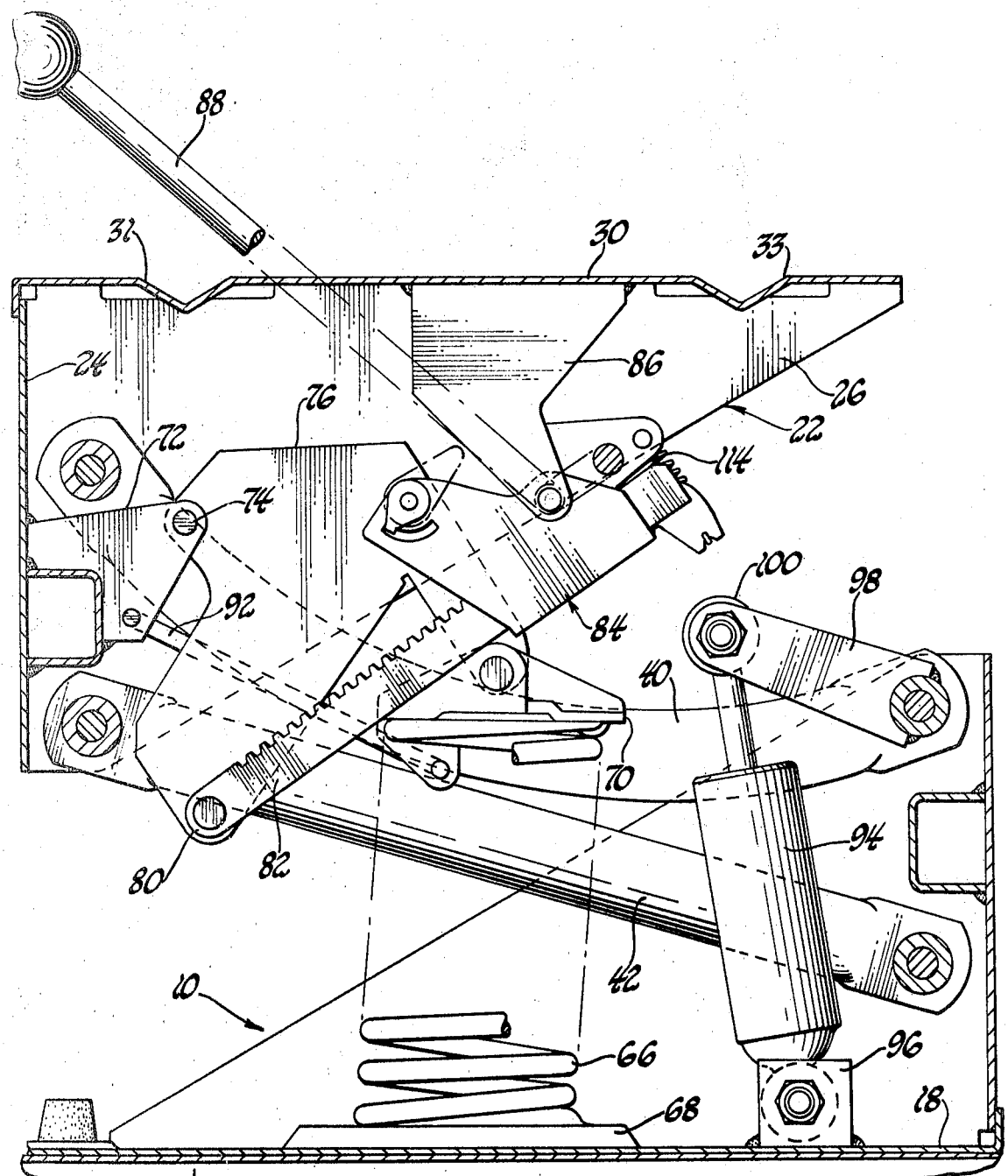
FIG. 2 is a side view of the FIG. 1 embodiment in a fully raised position.
Figure 3:
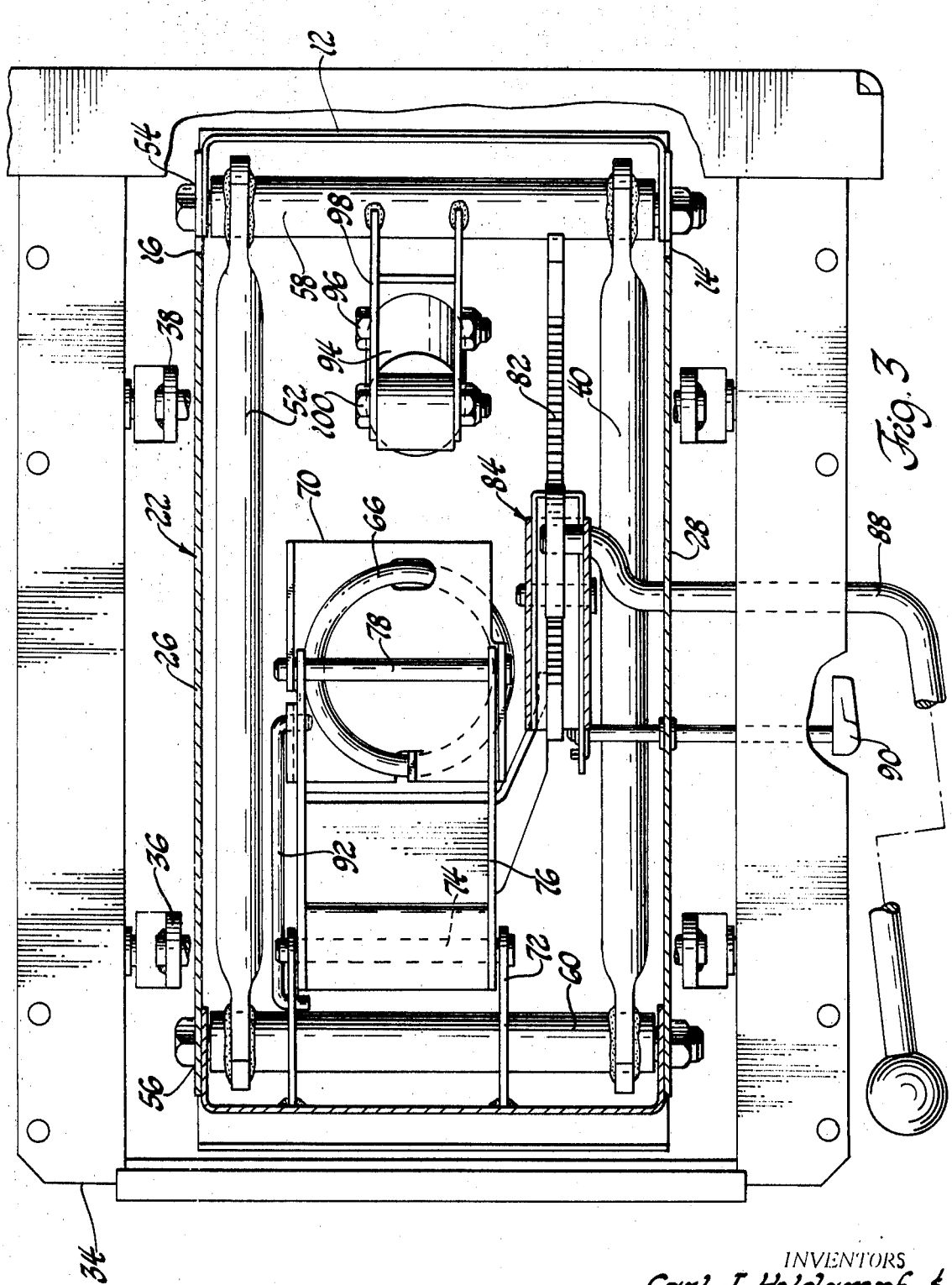
FIG. 3 is a plan view of the apparatus of FIGS. 1 and 2.

Referring to FIGS. 1 through 3, the seat mechanism includes a steel base member forming a lower suspension housing 10 having an upstanding rear wall 12, a pair of forwardly tapering triangular sidewalls 14 and 16, and a floor 18 which is adapted to be mounted upon a support surface 20 which may form part of a vehicle such as a truck or bus.

The apparatus further includes seat support means including an upper suspension housing 22 which is generally reversely similar to the lower suspension housing 10 and includes a vertical front wall 24 and a pair of laterally disposed triangular sidewalls 26 and 28 joined by a planar top section 30 having formed therein a pair of laterally extending indentations 31 and 33 as best shown in FIG. 2. A perimeter frame 34 surrounds the upper suspension housing 22 and is pivotally connected thereto by pivot shafts and support means 36 and 38 which rest within the laterally extending indentations 31 and 33. The perimeter frame 34 is adapted to receive in supported engagement therewith a seat 32 which may be of any suitable construction. The perimeter frame 34 and the pivot shaft and support means 36 and 38 permit a slight fore-and-aft rocking motion of the seat 32 relative to the upper suspension housing 22. This motion may, of course, be locked out as desired.

The upper and lower suspension housings 22 and 10, respectively, are interconnected by a parallelogram linkage which permits vertical displacement between the suspension housings without significantly changing the angular relation between the major planes of the top section 30 and the floor 18. This parallelogram linkage includes a pair of laterally spaced upper parallelogram bars 40 and 52 pivotally connected between the suspension housings 10 and 22, and a pair or lower parallelogram bars similarly connected below the bars 40 and 52. Of the two lower bars only 42 is visible in the drawings. To support the parallelogram bars and provide an interconnection between the bars and the sidewalls of the suspension housings 10 and 22, the ends of the parallelogram bars are connected to cross shafts 58, 60, 62 and 64. The cross-shafts are tubular and are provided with suitable bearings to permit angular displacement about an internal support shaft which connects directly to the suspension housing, either 10 or 22 as may be the case.

Cross-shaft 58 is pivotally connected between the rear portion of sidewalls 14 and 16 of lower suspension housing 10. A similar cross-shaft 60 connects the opposite ends of the parallelogram bars 40 and 42 pivotally between the sidewalls 26 and 28 of upper suspension housing 22 adjacent the forward portion thereof. A cross-shaft 62 secured to the rearward ends of lower parallelogram bars 42 is pivotally connected between the sidewalls 14 and 16 of lower suspension housing 10 at a point vertically beneath the cross-shaft 58 as shown in FIG. 1. The second lower cross-shaft 64 is pivotally connected between sidewalls 26 and 28 of the upper suspension housing 22 at a point vertically beneath the upper cross-shaft 60.

Still referring to FIGS. 1 through 3, the seat mechanism includes a generally upstanding heavy coil suspension spring 66 having the lower end thereof anchored to a lower spring seat 68 which, in turn, is secured to the floor 18 of lower suspension housing 10. The upper or free end of spring 66 is anchored to an upper spring seat 70. As is more fully described hereinafter the spring 66 supports the upper suspension housing 22 thereby to resiliently support the seat 32 relative to the vehicle support surface 20.

To connect the upper suspension housing 22 to the upper or free end of spring 66 the front wall 24 of the upper suspension housing 22 has secured thereto an anchor bracket 72 which, as best shown in FIG. 3, has a pair of rearwardly extending arms connected by a pivot shaft 74. Anchor bracket 72 is connected by way of pivot shaft 74 to a bellcrank 76. An upper extension of the bellcrank 76 is pivotally connected to the upper spring seat 70 by way of a pivot shaft 78. To rotate the bellcrank 76 about the pivot shaft 74 to thereby raise the upper suspension housing 22 relative to the upper or free end of spring 66, the lower extension of bellcrank 72 is pivotally connected to the output member or rack 82 of an adjuster mechanism 84 by way of a pivot 80.

The rack 82 operates together with the input portions of mechanism 84 which includes an actuator arm 88 and a direction selector 90. The jack mechanism 84 is pivotally connected at 91 to an anchor bracket 86 which is connected to the top section 30 of upper suspension housing 22. In addition, a stabilizer arm 92 is connected between the anchor bracket 72 and the upper spring seat 70 to prevent any tipping of the upper spring seat upon actuation of the jack mechanism 84 to adjust the vertical displacement between the upper and lower suspension housings 22 and 10, respectively. Parallelogram bar 40 is arcuate to provide clearance for the actuator arm 88.

Briefly discussing the operation of the apparatus described with reference to FIGS. 1 through 3, the actuator arm 88 may be manually operated to work the rack 82 downwardly through the jack mechanism 84 in a manner similar to the operation of a conventional automobile bumper jack. Driving the rack 82 downwardly through the jack mechanism 84 rotates the bellcrank 76 in a clockwise direction about the pivot shaft 74 which connects it to the anchor bracket 72. This rotation reacts the upper suspension housing 22 against the free end of the suspension spring 66 through the bellcrank 76 raising the upper suspension housing 22 and the components connected therewith relative to the upper end of spring 66. The parallelogram linkage previously described permits the upper suspension housing 22 to displace vertically away from or toward the lower suspension housing 10 without affecting the angular relation therebetween.

It is desirable to damp the spring action of suspension spring 66 to prevent oscillation of the upper suspension housing 22 relative to the support surface 20. To this end an hydraulic shock absorber 94 has the fixed end thereof pivotally connected at 96 to the floor 18 of the lower suspension housing 10 and the displaceable end thereof pivotally connected to a bracket 98 as indicated at 100. The bracket 98 is secured to the upper cross-shaft 58 which connects the upper parallelogram bars 40 and 52 to the sidewalls of the upper suspension housing 22. Accordingly, the hydraulic shock absorber 94 is mechanically connected in parallel with the suspension spring 66 to damp any oscillation thereof.

Figure 4:
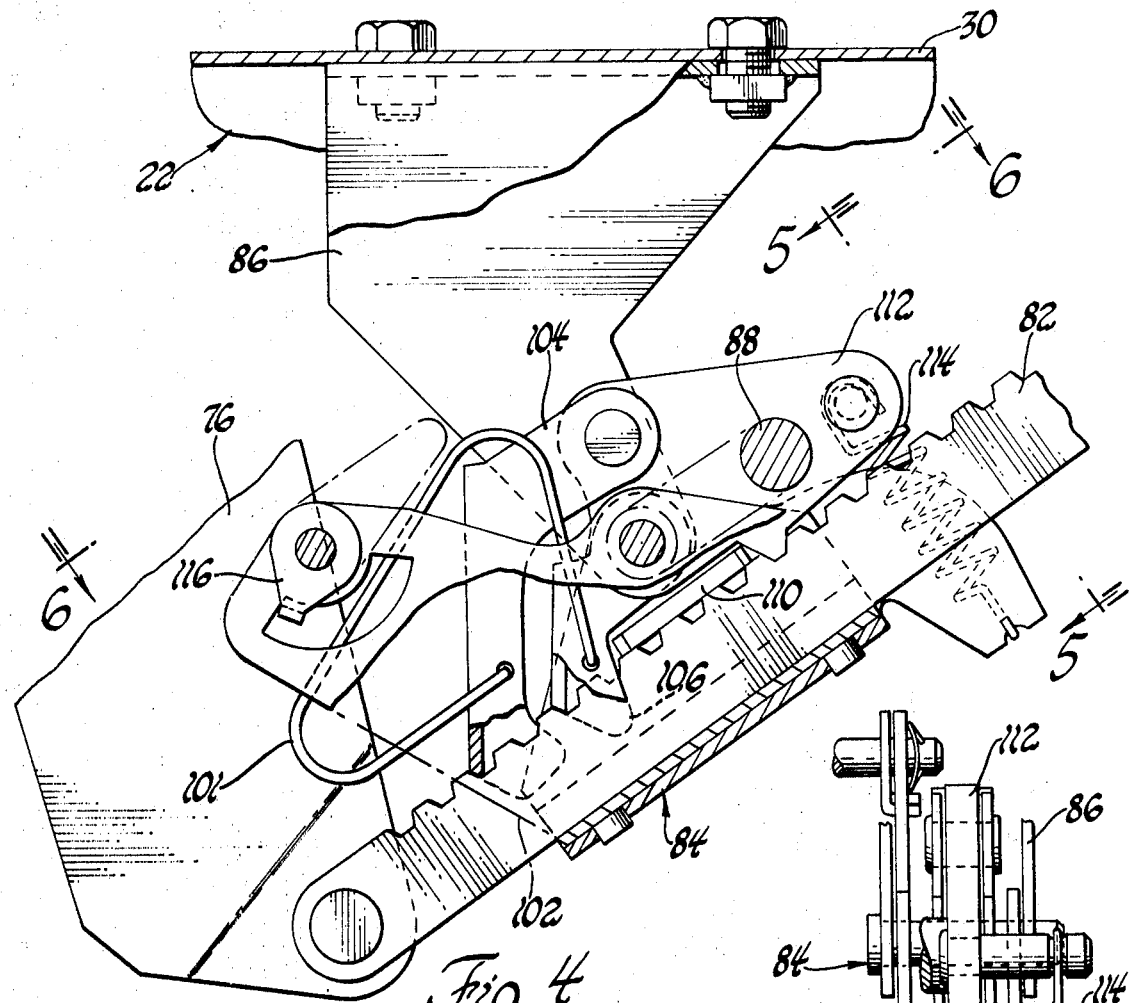
FIG. 4 is a side view of a jack mechanism suitable for application to the embodiment of FIG. 1.
Figure 5:
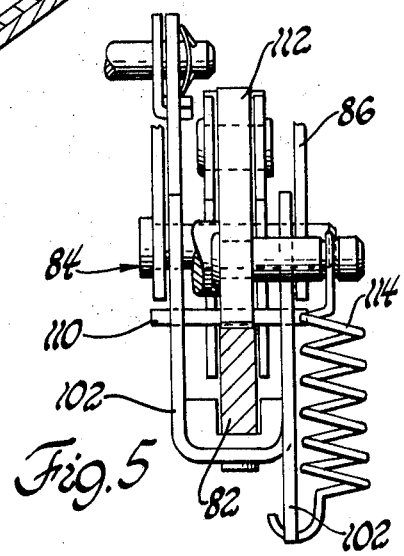
FIG. 5 is a front view of the jack mechanism.
Figure 6:
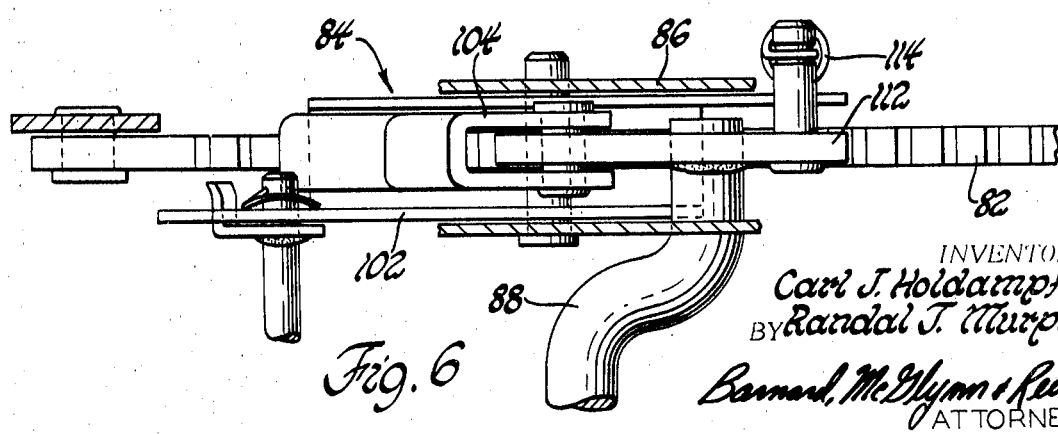
FIG. 6 is a plan view of the jack mechanism.

Referring now to FIGS. 4, 5, and 6 the jack mechanism 84 is shown in greater detail to include a rack 82 pivotally connected at 80 to the bellcrank 76 and slidably disposed within a jack housing 102. The housing 102 is pivotally connected to the anchor bracket 86 which depends from the upper suspension housing 22. In conventional fashion, the jack mechanism includes a drive pawl 104, a lock pawl 106, a jack spring 101, and a slider 110. In addition, the jack mechanism 84 includes a latch dog 112 connected by a spring 114 to the jack housing 102 so as to normally engage the rack 82 to prevent displacement thereof in either direction through the housing.

The operation of jack mechanism 84 is conventional except for the latch dog 112. Assuming the seat 32 is to be raised, direction selector lever 116 is placed in contact with spring 101 and actuator arm 88 lifts latch dog 112 out of firm engagement with rack 82 and forces pawl 104 forward extending the rack 82 from housing 102 until pawl 106 comes into contact with a succeeding tooth. To lower the seat 32, lever 116 is moved away from spring 101. Actuation of lever arm 88 then lifts lock pawl 112 out of rack 82 and pawl 104 is driven forward to relieve the load on latch 106. Spring 101 selectively lifts pawls 104 and 106 to retract the rack 82 into housing 102. Selector 90 determines the direction of jack travel in the conventional fashion by rotating lever 116 as described above.

Lock pawl 106 prevents only displacement of rack 82 upwardly through housing 102. Accordingly, if seat 32 were subjected to an upward force, the rack might thereby be freely drawn through housing 102 to the fully extended position. This reverse load might obtain during rebound from a road shock and thus may be termed a dynamic unloading condition.

To prevent the dynamic unloading condition from disturbing the vertical adjustment of seat 32, the latch dog 112 is firmly engaged with rack 82 except when adjustment is being made by way of arm 88. This engagement is assured by spring 114 which is tensioned between dog 112 and housing 102. Dog 112 is therefore a bidirectional lock which is disengaged by operation of arm 88 and drive pawl 104.

It is to be understood that the foregoing description is illustrative in nature and is not to be construed as limiting the invention to the specific design shown and described herein.

The embodiments of the invention in which an exclusive property or privilege is claimed are defined as follows:

We claim:

1. Adjustable seat apparatus comprising: a base member, a seat support member of variable spacing relative to the base member, means mechanically linking the base and seat support members for permitting said variable spacing, a spring member having a fixed end and a displaceable end, the fixed end being mounted on the base member, and seat height adjuster means of variable vertical length connected between the displaceable end of the spring member and the seat support member for effecting selectively variable displacement therebetween independent of any substantial variation in the vertical length of the spring member thereby to vary the normal unloaded vertical spacing between the seat support member and the base member.

2. Apparatus as defined in claim 1 further including spring displacement damping means connected mechanically in parallel with the spring member.

3. Adjustable seat apparatus as defined in claim 1 wherein said means linking the base and seat members includes at least one pair of parallelogram arms mechanically pivotally connected at respective ends thereof to the base and seat members.

4. Adjustable seat apparatus as defined in claim 2 wherein said spring displaceable damping means is an hydraulic shock absorber.

5. Adjustable seat apparatus comprising: a base member, a seat member of variable spacing relative to the base member and having a predetermined angular relationship therewith, means mechanically linking the base and seat members for permitting said variable spacing while substantially retaining the predetermined angular relationship, a spring member having a fixed end and a displaceable end, the fixed end being mounted on the base member, height adjuster means of selectively variable length connected between the seat member and the displaceable end of the spring member, said height adjuster means including a force transmitting mechanism having relatively displaceable input and output members, means connecting the output member to the displaceable end of the spring member, and means connecting the input member to the seat member whereby operation of the force transmitting mechanism to produce a relative displacement between said input and output members vertically displaces the seat member relative to the displaceable end of the spring member without affecting the length of the spring member.

6. Apparatus as defined in claim 5 further including spring displacement damping means mechanically connected in parallel with the spring member.

7. Apparatus as defined in claim 5 wherein said force transmitting mechanism is a jack, the input member is a pawl having a manually operable handle, and the output member is a rack, said combination further including a linking arm pivotally connected to both one end of the rack and the seat member.

8. Adjustable seat apparatus as defined in claim 5 wherein said means linking the base and seat members includes at least one pair of parallelogram arms mechanically pivotally connected at respective ends thereof to the base and seat members.

9. An adjustable seat apparatus comprising: a base, a seat support, means mechanically linking the base and seat support for permitting variable spacing therebetween while substantially retaining the angular relationship therebetween, a generally upstanding coil spring having one end seated on said base and the other end extending toward said seat support, force transmitting vertical height adjuster means connecting said other end of the spring to the seat support for effectively varying the vertical spacing therebetween and including a manually operable jack having a housing and a rack slidably displaceable through said housing, and a bellcrank pivotally connected to said other end of said spring, said rack and said seat support, said jack housing also being connected to said seat support whereby operation of said jack incrementally varies the vertical spacing between said seat and said base.

10. Adjustable seat apparatus as defined in claim 9 wherein said means mechanically linking the base and seat support comprises a parallelogram linkage, the combination further including stabilizer means connected between said seat support and said other end of said spring to prevent tipping thereof during pivotal motion of said bellcrank.

11. Adjustable seat apparatus as defined in claim 9 further including shock absorber means mechanically connected in parallel with said spring.

12. Adjustable seat apparatus as defined in claim 9 includes selectively disengageable latch means connected between said housing and said rack for bidirectionally latching said rack.

13. A force transmitting adjuster mechanism including a housing, a rack slidably displaceable through said housing, an actuator arm, a drive pawl connecting said actuator arm to said rack for displacing said rack, a lock pawl normally engaging said rack for preventing displacement of said rack in one direction, and a latch dog normally engaging said rack to bidirectionally latch said lock to said housing but being disengageable upon operation of said drive pawl.

14. Force transmitting adjuster apparatus as described in claim 13 further including a spring interconnecting said latch dog and said housing to urge the latch dog into engagement with said rack.

15. Adjustable seat apparatus as defined in claim 1 including a seat, and means interconnecting the seat and the seat support member for permitting limited longitudinal displacement therebetween.

16. Adjustable seat apparatus as defined in claim 15 wherein the last mentioned means includes a frame circumscribing the perimeter of seat support member and linking means pivotally connecting the frame to the seat support member to provide a longitudinal rocking motion between the seat and the seat support member.

17. Adjustable seat apparatus as defined in claim 10 including a frame circumscribing the perimeter of the seat support, a seat mounted on the frame, and pivotal means linking the frame to the seat support to permit limited longitudinal displacement therebetween.